United States Patent
Brown

[15] 3,675,674
[45] July 11, 1972

[54] CONNECTION FITTING DEVICE WITH CLEAN-OUT

[72] Inventor: Donald J. Brown, La Crescenta, Calif.
[73] Assignee: Morehouse Industries, Inc., Fullerton, Calif.
[22] Filed: Sept. 15, 1970
[21] Appl. No.: 72,452

[52] U.S. Cl. .................... 137/244, 251/324, 73/420
[51] Int. Cl. .................................................. F16k 5/22
[58] Field of Search ........... 137/240, 375, 244, 557, 245; 73/420, 324, 332; 251/324, 322

[56] References Cited

UNITED STATES PATENTS

| | | | |
|---|---|---|---|
| 2,530,433 | 11/1950 | Jaegle | 137/244 |
| 2,448,816 | 9/1948 | May | 137/244 |
| 2,963,259 | 12/1960 | Heyer et al. | 251/322 X |
| 1,704,759 | 3/1929 | Miller | 251/324 |
| 3,503,416 | 3/1970 | Clarkson | 137/375 |
| 1,872,211 | 8/1932 | Yarnall | 137/246.22 X |
| 2,197,352 | 4/1940 | Terkel | 251/322 X |
| 2,936,000 | 5/1960 | Mason | 137/557 |

Primary Examiner—Henry T. Klinksiek
Attorney—Whann & McManigal

[57] ABSTRACT

A connection fitting for mounting a pressure gauge or the like comprising a generally Y-shaped tubular body in which a straight body portion is threaded at one end for connection with a fluid source, the body having a branch portion for mounting the gauge, and with a reciprocable clean-out plunger in the straight body portion having an actuating part extending from the opposite end of the straight body portion, whereby the clean-out plunger can be moved across the inner end of the branch portion and into the fluid inlet flow path leading to the branch portion for keeping the same free of occluding media.

3 Claims, 2 Drawing Figures

PATENTED JUL 11 1972 3,675,674

DONALD J. BROWN
INVENTOR

WHANN & McMANIGAL
Attorneys for Applicant
BY

CONNECTION FITTING DEVICE WITH CLEAN-OUT

BACKGROUND OF THE INVENTION

The present invention relates generally to the field of pipe fittings and connectors.

Devices have heretofore been known for use in protecting inner workings of gauges which are connected to a vessel or container for fluids which are corrosive or contain media of a clogging nature. Such devices have in the main been unsatisfactory and have the same inherent weakness against clogging. For example, a diaphragm gauge has a diaphragm that separates the pressurized fluid from the working parts of the gauge to protect them from direct contact with corrosive fluid or clogging media. The entrance to the diaphragm is still vulnerable to the above noted conditions which can cause malfunction. Consequently some type of flushing arrangement must be provided or the gauge physically removed from the vessel and cleaned periodically.

Moreover, it has been known from U.S. Pat. Nos. 837,035 and 2,530,433 to incorporate a clean-out plunger as a part of the stem structure of a valve organization, such as utilized in gauge-cocks for boilers and for drain valves and the like for tanks or containers where there is a possibility of the valve flow passages becoming occulded by sediment, deposits, sludge and the like.

In these patentented structures, the combining of a clean-out plunger with valving elements for selective actuation to valve closed and valve opened positions, necessarily results in a relatively expensive structure, as compared to a simple fitting device according to the present invention, which embodies and is concerned only with the problem of keeping open a flow passage therein.

The present invention overcomes the problems of the heretofore known devices by providing a simple and economically producible generally Y-connection fitting in which a clean-out plunger is mounted in a main leg of the fitting. The structure of the present invention differs from the previously known arrangements as noted above, in that the plunger is normally urged to a retracted position, but may be manually operable to reciprocably move the plunger across and into the inlet fluid flow path connection to the branch leg of the fitting so as to keep the path open. A further feature of the improved fitting resides in the provision of a grease injecting fitting in the branch leg, whereby the bore passage may be filled with a grease material to form a barrier between the container to which the fitting is connected and a connected gauge instrument.

SUMMARY OF THE INVENTION

The present invention relates generally to a fitting structure such as utilized for making pipe connections, and is more particularly concerned with a fitting having a clean-out mechanical operable to prevent the fitting inlet from becoming occluded, without the necessity of having to disconnect the fitting.

Having in mind the inherent disadvantages of the known devices, it is one object of the present invention to provide as a unitary device, a connection fitting having a built-in clean-out means.

A further object of the herein described invention is to provide a fitting which is particularly advantageous for the mounting of pressure gauges and the like, and which incorporates manually operable means for maintaining the connecting passageways clear of occluding materials which could interfer with the gauge operation and produce erroneous readings.

Another object is to provide a connection fitting having clean-out components, the fitting having a branch connection adapted for the connection of an instrument such as a pressure gauge, and wherein the branch connection is provided with a fitting for the injection of a grease into the flow path through the branch.

Still another object is to provide a simple lever actuator for moving the clean-out plug, whereby greater mechanical advantage may be obtained.

Further objects and advantages of the present invention will be brought out in the following parts of the specification, wherein the detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT

Figure 1:
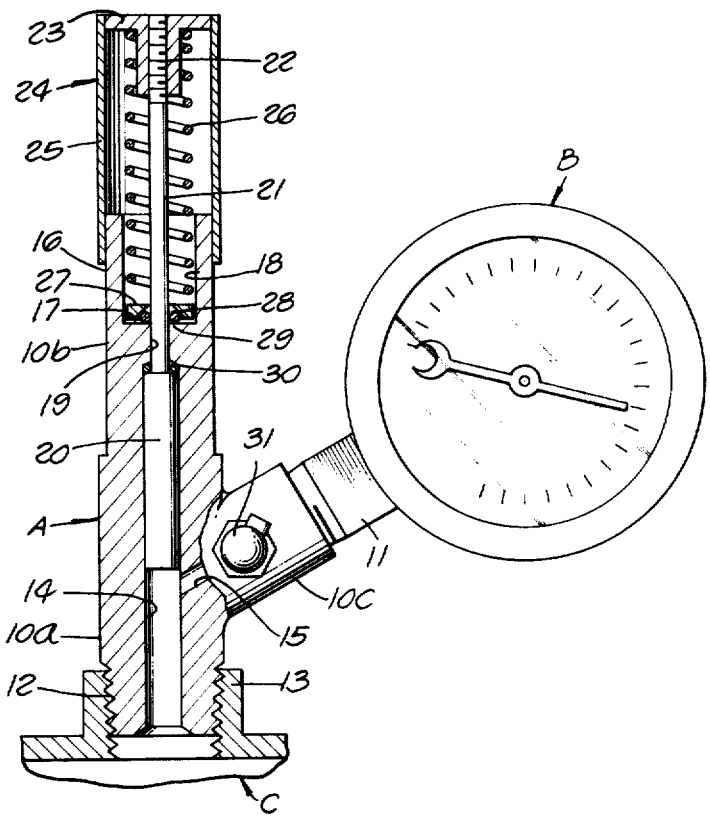
FIG. 1 is an elevational view, partly in section, showing a connection fitting device embodying the features of the present invention.
Figure 2:
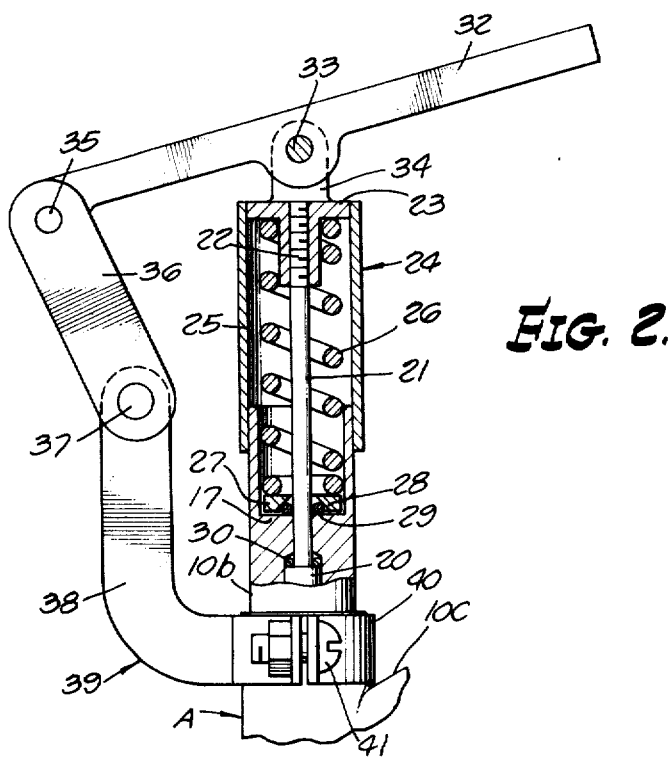
FIG. 2 is a fragmentary view partly in section, showing a modified arrangement in which an actuating lever is provided for obtaining mechanical advantage.

For illustrative purposes, the present invention is shown in FIG. 1 as embodying a fitting A which is arranged for the mounting of a pressure gauge, generally indicated at B, upon a tank or container as generally indicated at C, for a fluid under pressure, and particularly a fluid which of itself might have a deleterious effect upon the gauge, or which may contain media of an occluding nature such as might form a sediment, deposits or sludge in the passages connected to the gauge.

More particularly, the fitting A comprises a generally Y-shaped body in which two legs of the Y, as shown at 10a and 10b are in axial alignment, while the third leg 10c extends laterally at an angle to form a branch connection which is arranged to be connected in a conventional manner with a connection stem 11 of the gauge.

The leg 10a is threaded as shown at 12 to provide a connection nipple which may be connected with the container connection 13.

The connection nipple 12 connects with an axially extending first bore portion 14 of a sufficient length to extend into the leg 10b. A branch bore 15 extends into the leg 10c to provide a communication with the gauge.

The leg 10b at its outermost end is provided with an end cylindrical body portion 16 which extends outwardly from a bottom wall defined by an annular flange 17 of the bore wall and forms an enlarged second bore portion providing an end opening recess 18 which axially connects with the first bore portion 14 through a bottom wall restricted passage 19.

The bore 14 has reciprocably movably mounted therein a clean-out plunger 20 which is connected at its uppermost end with an elongate stem 21, this stem extending through the bottom wall passage 19 and being of sufficient length to extend beyond the outer end of the fitting leg 10b.

The outermost end of the stem 21 is threaded, as indicated at 22, for connection with a bottom 23 of an inverted cap member 24, a tubular side wall 25 extending from the bottom 23 and having overlapping sliding engagement with the outer wall surface of the cylindrical body portion 16.

For normally yieldingly urging the plunger 20 in a direction towards the bottom wall 17, and the connected cap 24 to an outwardly position with respect to the cylindrical body portion 16, there is provided a compression spring 26 which surrounds the projecting end of the stem 21 and is positioned with one end in engagement with the bottom 23 on the cap member. The opposite end of this spring acts against the bottom wall 17, an abutment washer 27 being interposed between the spring end and the adjacent wall.

The washer 27 is utilized to provide a dynamic seal at the adjacent end of the bottom wall passage 19, and for this purpose is centrally provided with a bevelled annular seat 28 in confronting relation to the bottom wall 17. The annular seat is operatively engaged with an O-ring 29 positioned between the washer and adjacent surface of the bottom wall 17.

At the other end of the wall passage 19, there is provided a static seal in which an O-ring 30 surrounds the stem 21, this O-ring being disposed between the adjacent end of the plunger 20 and the adjacent surface of the bottom wall 17.

As described above, it will be apparent that the clean-out plunger 20 will normally be positioned as shown in FIG. 1, wherein the outer end of the plunger is spaced so as to not interfere with the communication between the inlet end of the bore 14 and the branch bore 15. However, when it is desired to clean-out the inlet of the fitting, this is easily done simply by manually depressing the cap 24. By alternately depressing and releasing, the clean-out plunger will be reciprocated in the bore 14 and thus facilitate the clean-out operation.

In some installations, it is desirable to protect the working parts of the gauge from direct contact by the fluid in the container C. This may be done by using an injection fitting 31 of conventional type having connection with the branch bore 15. This fitting permits the injection of a grease into the bore 15 ahead of the gauge connection.

In some installations higher pressures may require the use of a stronger spring 26, and thereby necessitate that a greater pressure be applied to the cap 24 than would be possible simply by pushing the cap with the bare hand. For such purpose, an actuating lever 32 may be provided. In the embodiment shown, this lever is pivoted intermediate its ends by a pin 33 to a pair of spaced ears 34—34 affixed to the bottom 23 of the cap. One end of this lever is fulcrumed by a pivot pin 35 at one end of a swingable link 36 having its other end connected by a pivot pin 37 to a bracket arm 38 of a bracket 39. This bracket may assume various constructions, and could be integrally formed with the fitting body. However, in the illustrated structure, the bracket is provided with a split clamping ring 40 arranged to be tightly secured by means of a clamping bolt 41 in a well known manner.

From the foregoing description, it is believed that it will be clearly apparent that the stated objects of this invention will be obtained by the structure according to the foregoing description.

Various modifications may suggest themselves to those skilled in the art without departing from the spirit of my invention, and, hence, I do not wish to be restricted to the specific forms shown or uses mentioned.

I claim:

1. A connecting fitting unit for connecting a pressure indicating device with a source of pressurized fluid, the fitting having means manually operable to clean out and maintain a connecting passage in the fitting free of any occluding media carried by the pressurized fluid, comprising:
   a. a generally Y-shaped hollow body structure, including: a straight body portion with a mounting connection at one end, and an integrally formed lateral branch body portion with a mounting connection at its outer end for a pressure indicating device; an aerial bore in said straight body portion including a first bore portion of uniform diameter in communication with said one end of the body and said lateral branch portion, an enlarged second bore portion of uniform diameter in communication with the other end of said body portion, and an annular flange in the bore wall between the inner ends of said bore portions defining a restricted passage between the bore portions;
   b. a cleaning plunger reciprocable in said first bore portion having an elongate stem at its inner end extending through said restricted passage and outwardly beyond the other end of said body portion;
   c. a compression coiled spring surrounding said stem with its inner end restrained by said annular flange and its outer end being restrained by an abutment carried by the outer end of the stem, said spring acting to normally position said plunger in said first bore portion so as to enable unobstructed communication with said branch body portion, but being manually movable towards said one end against the pressure of said spring to effect a clean-out operation in said first bore portion; and
   d. means for sealing said stem in respect to said restricted passage.

2. A fitting device according to claim 1, including a grease injecting fitting mounted on said lateral branch of said body structure, and having a communicating connection with said branch interior.

3. A connection fitting according to claim 1, wherein said sealing means comprises an O-ring operative between the inner end of said plunger and said flange to provide a static seal, an abutment washer between the inner end of said spring and said flange having a bevelled annular seat facing said flange, and an O-ring operative between said seat and flange to provide a dynamic seal.

* * * * *